United States Patent Office 3,786,113
Patented Jan. 15, 1974

3,786,113
COMPOSITION CONTAINING AN ACRYLIC RESIN, A POLYETHYLENEIMINE, AND A POLYEPOXIDE
Neiko I. Vassileff, Eastchester, N.Y., assignor to National Patent Development Corporation, New York, N.Y.
No Drawing. Filed Feb. 14, 1972, Ser. No. 226,258
Int. Cl. C08g 45/04
U.S. Cl. 260—836                                11 Claims

ABSTRACT OF THE DISCLOSURE

Polymer compositions showing selective permeability for gas and water vapors are prepared through intimate admixture of a polyacrylic resin with a polyethylenimine in a weight ratio of from about 5:1 to about 2:1, respectively, and cross-linking the resultant mixture. The polyacrylic resin is predominantly composed of monomer units derived from one to five types of carboxy-containing unsaturated monomers such as acrylic acid, methacrylic acid, itaconic acid, the esters thereof, the amides thereof and the nitriles thereof. The polyethylenimine can be unsubstituted or substituted on the imine group by alkyl, hydroxyalkyl, hydroxychloroalkyl, hydroxysulfoalkyl, epoxyalkyl, phenylalkyl, cyanoalkyl or carbamyl groups. At least the polyethylenimine component of the composition is cross-linked, either internally through the use of an agent such as zinc ammonium carbonate or through addition of a cross-linking agent such as an epoxide.

DETAILED DESCRIPTION

The present invention pertains to a novel polymeric composition which demonstrates selective permeability and thus permits the passage of water and gas vapor through films of the polymer. The resultant "breathable" polymer thus finds use in a wide variety of applications in which it is desirable to permit the passage of such vapors through the polymer. For example, in films employed in the coating of certain food products, in particular fruits and vegetables, it is desirable to permit the passage of some moisture, oxygen and carbon dioxide through the coating without passage of larger molecules. In films employed in bandages, the passage of such vapors is also advantageous. Various cosmetic products such as hair sprays and nail enamels should not seal off the normal respiratory processes and, again, the polymeric compositions of the present invention permit the requisite passage of gases and water vapor.

The present polymeric compositions comprise a homogeneous mixture of at least one polyacrylic resin and at least one polyethylenimine. This mixture is then subjected to conditions which effect cross-linking. Generally, the amount of polyacrylic resin will be from about 1 to about 5 times that of the polyethylenimine. The admixture is then cross-linked, utilizing conventional methods well known to the art. While the cross-linking will necessarily involve the polyethylenimine, it can, in certain instances depending upon the nature of the pendant groups of the polyacrylic resin, also involve this component.

A convenient method for arriving at a suitably intimate mixture of the two major components is to prepare the polyacrylic resin, through conventional polymerization techniques, in solution and to add to this solution the polyethylenimine. The resulting mixture of the two polymeric substances is then cross-linked, as discussed in greater detail below.

The polyacrylic resin employed in these compositions is substantially of the same type as that well known to the art. Thus for example, the resin can be a homopolymer or a random interpolymer in which the predominant monomeric unit is acrylic acid, methacrylic acid, itaconic acid, an ester of these, an amide of these, or a nitrile of these. Suitable esters include straight and branched chain alkyl esters of from 1 to about 20 carbon atoms such as for example the methyl, ethyl, n-butyl, isobutyl, n-propyl, isopropyl, t.-butyl, hexyl, octyl, dodecyl, octadecyl and the like cycloaliphatic esters of from about 3 to about 12 carbon atoms such as cyclohexyl, isobornyl, cyclooctyl and the like; substituted alkyl esters in which the substituents can be halogen, hydroxy, epoxy or amino, including monoalkyl and dialkyl amino, as for example hydroxyethyl, hydroxypropyl, dimethylaminoethyl, t.-butylaminoethyl, glycidyl; aromatic esters such as phenyl; and the like. Alternatively or in addition, the monomers can be amides of the foregoing acids, as for example methacrylamide, N,N-dimethylacrylamide, N-methylolacrylamide, or etherified methylolacrylamide. Likewise the nitriles of these acids such as acrylonitrile, methacrylonitrile and the like can be employed. In addition, bisacrylic monomers can be utilized, as for example N,N'-methylene-bisacrylamide, ethylene glycol dimethacrylate, 1,3-butyleneglycoldimethacrylate and the like.

The foregoing monomers constitute the predominant monomeric unit of the polyacrylic resin; i.e., at least 75 or 80% to 100% of the resin. In addition, other polymerizable monomers can be incorporated therein, as for example vinyl acetate, styrene, vinyl toluene, butadiene, vinyl ethers, maleate esters and the like.

It is to be noted that the polyacrylic resin can be either a homopolymer formed through the use of only one acrylic monomer; e.g., polymethyl methacrylate, or can be a random interpolymer utilizing up to as many as five different acrylate monomers.

In a preferred embodiment, the polyacrylic resin is reactive; i.e., at least one of the monomers supplies a pendant group capable of being cross-linked. In such an embodiment cross-linking between the polyacrylic resin and the polyethylenimine is possible.

The second component of the present composition is a polyethylenimine which can be graphically depicted as being of the general formula $(-CH_2-CH_2-NH-)_x$. These are well known, commercially available substances which have been prepared with molecular weight ranging from about 300 to about 100,000. In addition to the unsubstituted polyethylenimine, one can also employ various modified derivatives thereof in which pendant groups have been bound to some or all the imine groups or the terminal amino groups. Such derivatives include those obtained upon treating polyethylenimine with for example alkylene oxides, such as ethylene oxide, so as to yield a hydroxyalkylated polyethylenimine; those obtained with epichlorohydrin so as to yield an epoxyalkylated and/or hydroxychloroalkylated polyethylenimine; phenylalkyl derivatives such as for example poly-N (2-phenethyl) aziridine; 2-cyanoethyl modified polyethylenimine; urea modified polyethylenimine; the polyethylenimine obtained upon treatment with a sulfonated epichlorohydrin so as to yield an amphoteric hydroxysulfoalkyl substituted polyethylenimine; and the like.

The various polyethylenimine derivatives recited above are well known to the art and merely representative of various other derivatives of polyethylenimine which being readily available can be employed in a similar fashion.

The two principal components are advantageously mixed in the manner described above, namely forming the polyacrylate in situ from the appropriate monomers. This can be done in a suitable solvent such as an alkanol in the presence of a peroxy catalyst. The reaction solution, together with a suitable solvent such as an alcohol is then mixed, without isolation of the resin, with the polyethylenimine, also in a solution, as for example in water or an alkanol. Generally the amount of polyacrylic resin will be from 1 to 5 times the amount of the polyethylenimine.

Thus for example, to 100 parts of the polyacrylic resin are combined with from about 20 to about 100 parts of a polyethylenimine.

The mixture is next subjected to conditions which promote cross-linking. Such cross-linking will necessarily involve the polyethylenimine; depending upon the nature of the pendant groups in the polyacrylic resin, cross-linking can also involve this component. The cross-linking can be effected internally through the use of known cross-linking promoting agent, as for example zinc ammonium carbonate, ammonium dichromate and the like. Alternatively, a cross-linking reagent such as an epoxide can be employed. These include such materials as glycerol epoxy resins, polycycloaliphatic polyepoxides, and similar epoxides well known for their cross-linking properties.

The amount of cross-linking agent depends upon the particular agent employed and the degree of cross-linking desired in the final product and can readily be determined empirically for any given mixture of the two principal components. Generally when an epoxide cross-linking agent is utilized, it is employed in a quantity of substantially the same magnitude as the polyethylenimine, the amount ranging from about 0.5 part to about 2 parts of cross-linking agent for each part of polyethylenimine.

Representative of the monomers employed in preparing the polyacrylic resins are the following:

Methacrylic acid
Methyl methacrylate
Ethyl methacrylate
n-Propyl methacrylate
Isopropyl methacrylate
n-Butyl methacrylate
Isobutyl methacrylate
t.-Butyl methacrylate
Hexyl methacrylate
Octyl methacrylate
Dodecyl methacrylate
Octadecyl methacrylate
Cyclohexyl methacrylate
Phenyl methacrylate
Isobornyl methacrylate
Hydroxyethyl methacrylate
2-hydroxypropyl methacrylate
Ethylene glycol dimethacrylate
1,3-butylene glycol dimethacrylate
Dimethylaminoethyl methacrylate
t.-Butylaminoethyl methacrylate
1-chloro-2-hydroxypropyl methacrylate
Itaconic acid
Acrylic acid
Hydroxyethyl acrylate
Hydroxypropyl acrylate
2-ethylhexyl acrylate
Methyl acrylate
Ethyl acrylate
Butyl acrylate
t-Octyl acrylate
Acrylamide
Methacrylamide
N-isopropyl acrylamide
N-t.-butyl acrylamide
N-methylol acrylamide
N,N'-methylene-bis-acrylamide
Acrylonitrile, and
Methacrylonitrile Representative of the polyethylenimine are the unsubstituted polyethylenimines (PEI) of molecular weight from 300 to 100,000; hydroxyethylated PEI; alkoxylated PEI wherein the ratio of alkylene oxides to polyethylenimine varies from 0.1:1 to 10:1; epichlorohydrin modified PEI; poly-N-(2-phenethyl)aziridine; poly-N-(2-cyanoethyl)aziridine; urea modified PEI, obtained as a reaction product of PEI and urea; amphoteric PEIs prepared from the reaction of PEI with 3-chloro-2-hydroxypropanesulfonate (which in turn is obtained from epichlorohydrin and sodium bisulfite in water); and quaternized PEI having a percentage of quaternization of from 25% to 75%. Such materials are well known and commercially available, e.g., Dow Chemical Company's PEI 600E, propoxylated PEI 600, ethoxylated PEI 600 (XD–1037, 1037.1, 1037.2, 1037.3), epichlorohydrin modified PEI (XD–1868, XD–1868.3), poly-N(2-phenethyl)aziridine (NC–1363), poly-N(2-cyanoethylaziridine (NC–1429), urea modified PEI (XD–1736, XD–1737) and the like.

Typical of the epoxides employed as cross-linking agents are those available from Shell Chemical Company under the trademark Epon®. These are typically such compounds as Epon 812, 871, 872, 152, 154 and the like having epoxy equivalents ranging from 172 to 6,000, an epoxide equivalent being the grams of resin containing 1 gram-equivalent of epoxide. In addition, there can be employed such polycycloaliphatic polyepoxides as 3,4-epoxy-6-methylcyclohexylmethyl 3,4-epoxy-6 - methylcyclohexanecarboxylate; 3,4-epoxycyclohexylmethyl 3,4-epoxycyclohexanecarboxylate; bis-(3,4-epoxy-6 - methylcyclohexylmethyl)adipate; bis-(2,3-epoxycyclopentyl)ether; 1,2-bis-(2,3-epoxycyclopentoxy)ethane; 3-(3,4-epoxycyclohexyl)-9,10-epoxy-2,4-dioxaspiro[5.6]undecane; and the like.

The following examples will serve to further typify the nature of the present invention without being a limitation on the scope thereof, the invention being defined solely by the appended claims.

GENERAL PROCEDURE

A 1,000 ml. three-neck flask is equipped with a thermometer, mixer and reflux condenser. The acrylic monomers and sufficient solvent (generally about 3.5 times v./w. of total monomer) are introduced with stirring and to this stirred solution is added the polymerization catalyst (t-butylperoxy-2-ethylhexanoate). The resultant mixture is heated at reflux with stirring for from 2 to 24 hours. The resultant polymer, which is generally formed in yields of from 85 to 95%, is diluted with water, alcohol, or a mixture thereof from 25% total solids to 5%, 10% or 15% total solids and mixed with the polyethylenimine. The mixed polymers are in turn mixed with the cross-linking agent and cured.

The foregoing general procedure was employed in formulating the following polymeric compositions.

Example 1

Monomers:
- Methyl _____ g__ 80
- Hydroxypropyl methacrylate _____ g__ 20

Catalyst _____ g__ 0.3
Temperature _____ ° C__ 89
Time _____ hrs__ 6.5
PEI
- 1800 M.W., ethylene oxide modified (1:1) __g__ 20
- 1800 M.W., urea modified (1.43:1) _____ g__ 15

Mixing solvent—Ethanol _____ g__ 280
Cross-linking agent — Zinc ammonium carbonate _____ g__ 10

Example 2

Monomers:
- Hydroxyethyl methacrylate _____ g__ 67
- Isopropyl methacrylate _____ g__ 20
- t-Butylaminoethyl methacrylate _____ g__ 10
- Ethylene glycol dimethacrylate _____ g__ 3

Catalyst _____ g__ 0.4
Temperature _____ ° C__ 89
Time _____ hrs__ 7
PEI:
- 60,000 M.W. urea modified (4.36:1) _____ g__ 15
- 1,200 M.W. epichlorohydrn modified (1:0.85) _____ g__ 25

Mixing solvent—1:1 ethanol:water _____ g__ 280
Cross-linking agent—Epon 812 glycerol epoxy resin _____ g__ 15

Example 3

Monomers:
- Methyl methacrylate _____ g__ 60
- Isopropyl methacrylate _____ g__ 10
- Acrylamide _____ g__ 10
- Itaconic acid _____ g__ 20

Catalyst _____ g__ 0.5
Temperature _____ ° C__ 89
Time _____ hrs__ 9
PEI—60,000 M.W. epichlorohydrin sulfonate Na (pH 7) _____ g__ 25
Mixing solvent—water _____ g__ 250
Cross-linking agent—Epon 812 glycerol epoxy resin _____ g__ 10

Example 4

Monomers:
- Methyl methacrylate _____ g__ 35
- Hydroxyethyl methacrylate _____ g__ 35
- Glycidyl methacrylate _____ g__ 10
- Ethyl 2-hydroxyethyl methacrylate ___ g__ 10
- 2-hydroxypropyl methacrylate _____ g__ 10

Catalyst _____ g__ 0.5
Temperature _____ ° C__ 89
Time _____ hrs__ 11
PEI—1,800 M.W. urea modified (1:1) __ g__ 25
Mixing solvent—2:1 ethanol:water _____ g__ 300
Cross-linking agent—Epon 812 glycerol epoxy resin _____ g__ 20

Example 5

Monomer—methyl methacrylate _____ g__ 100
Catalyst _____ g__ 0.3
Time _____ hrs__ 8
PEI—300 M.W., unmodified _____ g__ 15
Mixing solvent—1:1 ethanol:water _____ g__ 250
Cross-linking agent—Epon 812 glycerol epoxy resin _____ g__ 15

Example 6

Monomers: G.
- Dodecyl methacrylate _____ 20
- Hydroxyethyl methacrylate _____ 10
- Methyl methacrylate _____ 70

Catalyst _____ 0.5

The monomers and catalyst are dissolved in 350 g. of isopropanol under steady agitation with heat of 89° C. The polymerization is completed in 5.5 hours in 87% yield. The resulting polymer has a M.W. of 57,000 in a solution of approximately 25% total solids. This is combined with 100 g. of ethanol and 100 g. of water, together with 30 g. of polyethylenimine of 300 M.W. The resultant mixture is cross-linked with 25 g. of glycerol epoxy resin (Epon 812).

Example 7

Monomers: G.
- Stearyl methacrylate _____ 15
- Hydroxyethyl methacrylate _____ 25
- Methyl methacrylate _____ 50
- Ethyl methacrylate _____ 10

Catalyst _____ 0.5

The monomers and catalyst are dissolved in 350 g. of isopropanol under steady agitation with heat of 89° C. The polymerization is completed in 7.5 hours in 88% yield. The resulting polymer of M.W. 55,000 in a solution of approximately 25% total solids is combined with a mixture of 150 g. of ethanol, 100 g. of water and 35 g. of PEI of M.W. 300 modified with urea (4.32:1.0). The mixture is cross-linked with 20 g. of glycerol epoxy resin (Epon 812).

Example 8

Monomers: G.
- Cyclohexyl methacrylate _____ 10
- Hydroxyethyl methacrylate _____ 15
- Ethyl methacrylate _____ 15
- Butyl methacrylate _____ 10
- Methyl methacrylate _____ 50

Catalyst _____ 0.5

The monomers and catalyst are dissolved in 350 g. of isopropanol which is introduced in the reaction vessel under steady agitation with heat of 89° C. The polymerization is completed in 7.5 hours in 91% yield. The resulting polymer of 48,000 M.W. in solution of approximately 25% total solids is combined with 100 g. of ethyl alcohol, 100 g. of water and 50 g. of PEI 1200 modified with epichlorohydrin (1:0.85). The mixture is cross-linked with 35 g. of glycerol epoxy resin (Epon 812).

Example 9

Monomers: G.
- Dodecyl methacrylate _____ 10
- Methacrylic acid _____ 10
- Itaconic acid _____ 10
- Ethyl methacrylate _____ 10
- Methyl methacrylate _____ 10

Catalyst _____ 0.6

The monomers and catalyst are dissolved in 350 g. of isopropanol in a flask under steady agitation with heat of 89° C. The polymerization is completed in 8.0 hours in 87% yield. The resulting polymer of M.W. 63,000 in a solution of approximately 25% total solids is combined with 100 g. of ethyl alcohol, 100 g. of water and 50 g. of PEI 600 modified with ethylene oxide (1:1). The mixture is cross-linked with 20 g. of zinc ammonium carbonate (6% Zn solution).

Example 10

Monomers: G.
- Phenyl methacrylate _____ 10
- Isopropyl methacrylate _____ 15
- Ethyl methacrylate _____ 15
- Methyl methacrylate _____ 60

Catalyst _____ 0.6

The monomers and catalyst are dissolved in 350 g. of isopropanol in a flask under steady agitation with heat of 89° C. The polymerization is completed in 5.0 hours in 78% yield. The resulting polymer of M.W. 39,000 in a solution of approximately 25% total solids is combined with 100 g. of ethyl alcohol, 100 g. of water and 40 g. of PEI 60,000 M.W. which has been hydroxyethylated. The mixture is cross-linked with 30 g. of glycerol epoxy resin (Epon 812).

Example 11

Monomers: G.
- Isobornyl methacrylate _____ 15
- Ethyl methacrylate _____ 15
- Isopropyl methacrylate _____ 15
- Dimethylaminoethyl methacrylate _____ 15
- Methyl methacrylate _____ 40

Catalyst _____ 0.6

The monomers and catalyst are dissolved in 350 g. of isopropanol in a flask under steady agitation with heat of 89° C. The polymerization is completed in 4.76 hours in 84% yield. The resulting polymer of M.W. 44,000 in a solution of approximately 25% total solids is combined with 150 g. of ethyl alcohol, 150 g. of water and 20 g. of PEI (1800 M.W.). The mixture is crosslinked with 20 g. of glycerol epoxy resin (Epon 812).

Example 12

Monomers: G.
- Acrylonitrile _____ 10
- Ethyl methacrylate _____ 15
- Methyl methacrylate _____ 75

Catalyst _____ 0.6

The monomers and catalyst are dissolved in 350 g. of isopropanol under steady agitation with heat of 89° C. The polymerization is completed in 4.5 hours in a yield of 82%. The resulting polymer of M.W. 37,000 in a solution of approximately 25% total solids is combined with 100 g. of ethyl alcohol, 100 g. of water and 30 g. of PEI 20,000 M.W. The mixture is cross-linked with 20 g. of glycerol epoxy resin (Epon 812).

Example 13

Monomers: G.
- Methacrylic acid _____ 10
- Itaconic acid _____ 15
- Methyl methacrylate _____ 75
- Catalyst _____ 0.6

The monomers and catalyst are dissolved in 350 g. of isopropanol under steady agitation with heat of 89° C. The polymerization is completed in 5.0 hours in a yield of 88%. The resulting polymer of M.W. 39,000 in a solution of approximately 25% total solids is combined with 200 g. of water and 30 g. of PEI 1800 M.W. modified with ethylene oxide (1:1). The mixture is cross-linked with 25 g. of glycerol epoxy resin (Epon 812).

Example 14

Monomers: G.
- Vinyl acetate _____ 15
- Itaconic acid _____ 15
- Methyl methacrylate _____ 70
- Catalyst _____ 0.5

The monomers and catalyst are dissolved in 350 g. of isopropanol under steady agitation with heat of 89° C. The polymerization is completed in 4.3 hours in a yield of 83%. The resulting polymer of M.W. 27,000 in a solution of approximately 25% total solids is combined with 100 g. of ethyl alcohol, 200 g. of water and 50 g. of PEI M.W. 1800 modified with urea 1.43:1. The mixture is cross-linked with 40 g. of zinc ammonium carbonate (6% Zn solution).

Example 15

Monomers: G.
- Hydroxyethyl acrylate _____ 20
- Hydroxyethyl methacrylate _____ 20
- Methyl methacrylate _____ 60
- Catalyst _____ 0.6

The monomers and catalyst are dissolved in 350 g. of isopropanol under steady agitation with heat of 89° C. The polymerization is completed in 4.0 hours in a yield of 86%. The resulting polymer of M.W. 32,000 in a solution of approximately 25% total solids is combined with 200 g. of ethyl alcohol, 100 g. of water and 40 g. of PEI 60,000 modified with epichlorohydrinsulfonate Na. The resultant mixture is cross-linked with 15 g. of glycerol epoxy resin (Epon 812).

Example 16

Monomers: G.
- Hydroxypropyl acrylate _____ 20
- Hydroxyethyl methacrylate _____ 20
- Methyl methacrylate _____ 60
- Catalyst _____ 0.6

The monomers and catalyst are dissolved in 350 g. of isopropanol under steady agitation with heat of 89° C. The polymerization is completed in 4.0 hours in a yield of 91%. The resulting polymer of M.W. 35,000 in a solution of approximately 25% total solids is combined with 200 g. of ethyl alcohol, 100 g. of water and 40 g. of PEI and 60,000 modified with epichlorohydrinsulfonate (pH 5.0). The mixture is cross-linked with 20 g. of glycerol epoxy resin (Epon 812).

Example 17

Monomers: G.
- Dimethylaminoethyl methacrylate _____ 30
- Hydroxyethyl methacrylate _____ 70
- Catalyst _____ 0.5

The monomers and catalyst are dissolved in 350 g. of isopranpol under steady agitation with heat of 89° C. The polymerization is completed in 5.0 hours in a yield of 93%. The resulting polymer of M.W. 42,000 in a solution of approximately 25% total solids is combined with 100 g. of ethanol, 100 g. of water and 35 g. of PEI 60,000 M.W. modified with propylene oxide (1:1). The mixture is cross-linked with 30 g. of glycerol epoxy resin (Epon 812).

Example 18

Monomers: G.
- N-methylacrylamide _____ 20
- Hydroxyethyl methacrylate _____ 20
- Methyl methacrylate _____ 60
- Catalyst _____ 0.6

The monomers and catalyst are dissolved in 350 g. of isopropanol under steady agitation with heat of 89° C. The polymerization is completed in 4.3 hours in a yield of 81%. The resulting polymer of M.W. 31,000 in a solution of approximately 25% total solids is combined with 100 g. of ethanol, 200 g. of water and 30 g. of PEI of M.W. 300. The mixture is cross-linked with glycerol epoxy resin (Epon 812).

Example 19

Monomers: G.
- N-t.-butylacrylamide _____ 20
- Hydroxyethyl methacrylate _____ 20
- Itaconic acid _____ 20
- Methyl methacrylate _____ 40
- Catalyst _____ 0.6

The monomers and catalyst are dissolved in 350 g. of isopropanol under steady agitation with heat of 91° C. The polymerization is completed in 4.0 hours in a yield of 89%. The resulting polymer of M.W. 29,000 in a solution of approximately 25% total solids is combined with 250 g. of water and 40 g. of PEI, M.W. 60,000. The mixture is cross-linked with glycerol epoxy resin (Epon 812).

Example 20

Monomers: G.
- Allyl methacrylate _____ 25
- Hydroxyethyl methacrylate _____ 15
- N-t.-octylacrylamide _____ 15
- Methyl methacrylate _____ 45
- Catalyst _____ 0.6

The monomers and catalyst are dissolved in 350 g. of isopropanol under steady agitation with heat. The polymerization is completed in 4.0 hours in a yield of 83%. The resulting polymer of M.W. 44,000 in a solution of approximately 25% total solids is combined with 100 g. of ethanol, 150 g. of water and 50 g. of PEI 1200 modified with epichlorohydrin (1:0.85). The mixture is cross-linked with 0.4 g. of ammonium dichromate.

Example 21

Monomers: G.
- 2-(1-aziridinyl)ethyl methacrylate _____ 20
- Vinyl acetate _____ 20
- N-t.-butylacrylamide _____ 15
- Methyl methacrylate _____ 45
- Catalyst _____ 0.6

The monomers and catalyst are dissolved in 350 g. of isopropanol under steady agitation with heat of 89° C. The polymerization is completed in 6 hours in a yield of 92%. The resulting polymer of M.W. 37,000 in a solution of approximately 25% total solids is combined with 100 g. of ethanol, 150 g. of water and 25 g. of PEI, M.W. 600. The mixture is cross-linked with glycerol epoxy resin (Epon 812).

What is claimed is:

1. A composition of matter comprising a homogeneous mixture of (a) from about 1 to about 5 parts by weight of at least one polyacrylic resin, said resin being a homopolymer or random interpolymer containing at least 75% acrylic or methacrylic monomers and having at least one type of cross-linkable pendant functionality selected from the group consisting of carboxy, hydroxy, amino, amido, glycidyl and N-alkylolamido, and (b) about 1 part by weight of at least one polyethylenimine having

—CH$_2$CH$_2$NH— groups as the repeating units of the polymer chain, said polyethylenimine being selected from the group consisting of unsubstituted polyethylenimines and polyethylenimines modified prior to admixture with said resin through incorporation of alkyl, hydroxyalkyl, hydroxychloroalkyl, epoxyalkyl, hydroxysulfoalkyl, phenylalkyl, cyanoalkyl or carbamyl groups on at least some of said imine groups, said mixture being cross-linked after admixture with said resin with from about 0.5 part to about 2 parts, per part of polyethylenimine, of an epoxy crosslinking agent having at least two epoxy groups per molecule.

2. A composition according to claim 1 wherein said resin has a molecular weight of from about 1,000 to about 100,000.

3. A composition according to claim 2 wherein the predominant monomer units of said resin are derived from one to five types of carboxy containing unsaturated monomers selected from the group consisting of acrylic acid, methacrylic acid, itaconic acid, the esters thereof, the amides thereof and the nitriles thereof.

4. A composition according to claim 1 wherein said polyethylenimine has a molecular weight of from about 300 to about 100,000.

5. A composition according to claim 4 wherein said polyethylenimine has been modified prior to admixture with said resin through the incorporation of alkyl, hydroxyalkyl, hydroxychloroalkyl, hydroxysulfoalkyl, epoxyalkyl, phenylalkyl, cyanoalkyl or carbamyl groups on at least some of said imine groups.

6. Process for the preparation of a composition according to claim 1 which comprises intimately mixing the solution in which said polyacrylic resin has been formed with said polyethylenimine in a solvent and subjecting said mixture to cross-linking conditions.

7. A composition according to claim 1 comprising a homogeneous mixture of (a) from about 2 to about 5 parts by weight of at least one polyacrylic resin, said resin being a homopolymer or random interpolymer containing at least 75% acrylic or methacrylic monomers and being free of cross-linkable functionality, and (b) about 1 part by weight of at least one polyethylenimine having —CH$_2$CH$_2$NH— groups as the repeating units of the polymer chain, said polyethylenimine being selected from the group consisting of unsubstituted polyethylenimines and polyethylenimines modified prior to admixture with said resin through incorporation of alkyl, hydroxyalkyl, hydroxychloroalkyl, epoxyalkyl, hydroxysulfoalkyl, phenylalkyl, cyanoalkyl or carbamyl groups on at least some of said imine groups, said polyethylenimine being cross-linked after admixture with said resin with from about 0.5 part to about 2 parts, per part of polyethylenimine, of an epoxy, crosslinking agent having at least two epoxy groups per molecule.

8. A composition according to claim 7 wherein said resin has a molecular weight of from about 1,000 to about 100,000.

9. A composition according to claim 7 wherein said polyethylenimine has a molecular weight of from about 300 to about 100,000.

10. A composition according to claim 7 wherein the predominant monomer unit of said resin is an alkyl methacrylate.

11. Process for the preparation of a composition according to claim 7 which comprises intimately mixing the solution in which said polyacrylic resin has been formed with said polyethylenimine in a solvent and subjecting said mixture to cross-linking conditions.

References Cited

UNITED STATES PATENTS

| | | | |
|---|---|---|---|
| 3,574,053 | 4/1971 | Hine | 260—901 |
| 3,600,272 | 8/1971 | Cortigene | 260—47 EN |
| 3,107,427 | 10/1963 | Schmitt | 260—901 |
| 3,549,566 | 12/1970 | Mesirov | 260—901 |
| 3,702,349 | 11/1972 | Merlino | 260—830 R |

PAUL LIEBERMAN, Primary Examiner

U.S. Cl. X.R.

260—2 EN, 830 R, 837 R, 834, 849, 874, 898, 901